May 12, 1970     T. G. BIXBY ET AL     3,511,322
PERCUSSIVE HAMMER WITH VACUUM SYSTEM FOR
CLEANING DEBRIS FROM WORKPIECE
Filed Sept. 14, 1967     5 Sheets-Sheet 1
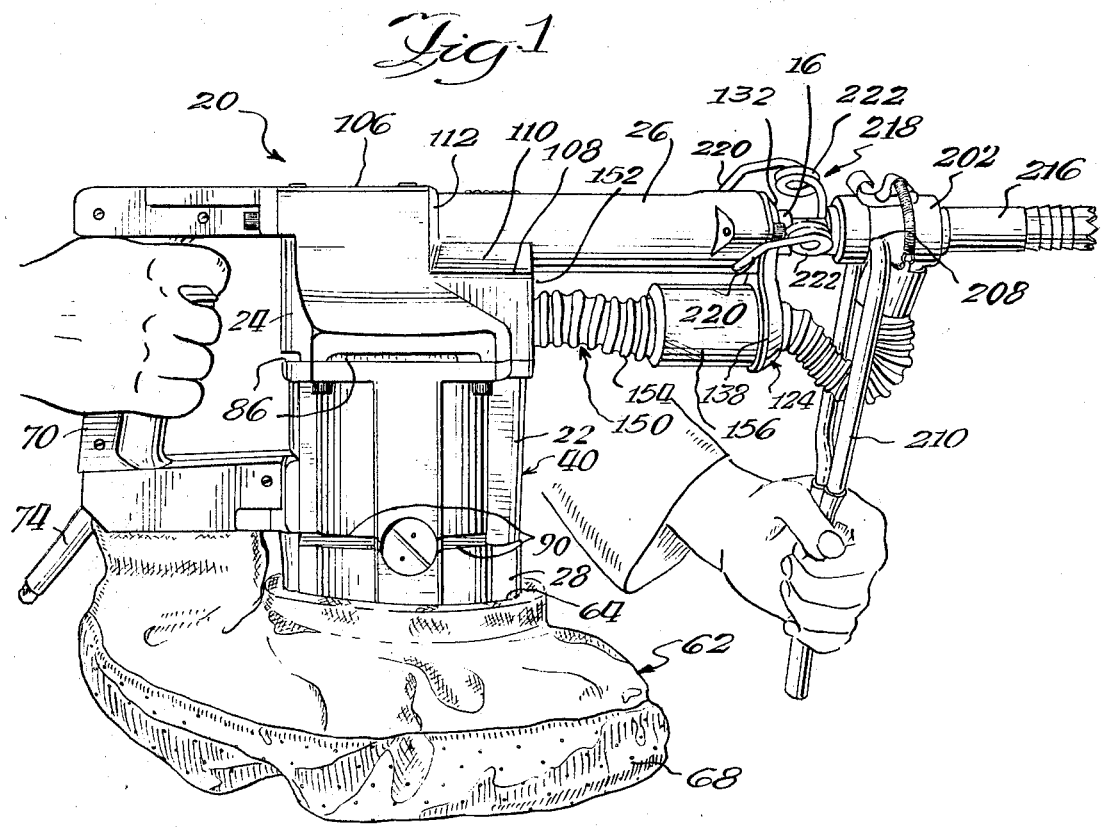
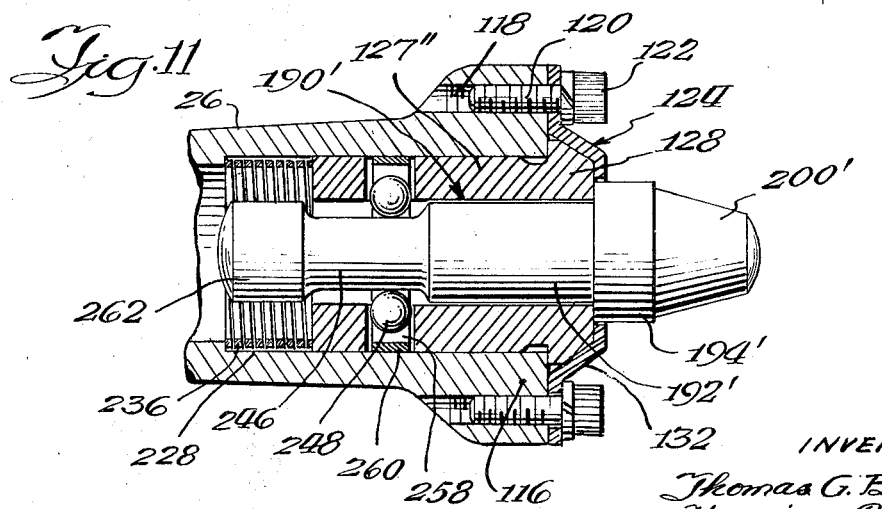
INVENTORS
Thomas G. Bixby
Harrison R. Holman
Bruce L. Kaufman
BY Silverman & Cass
ATTORNEYS

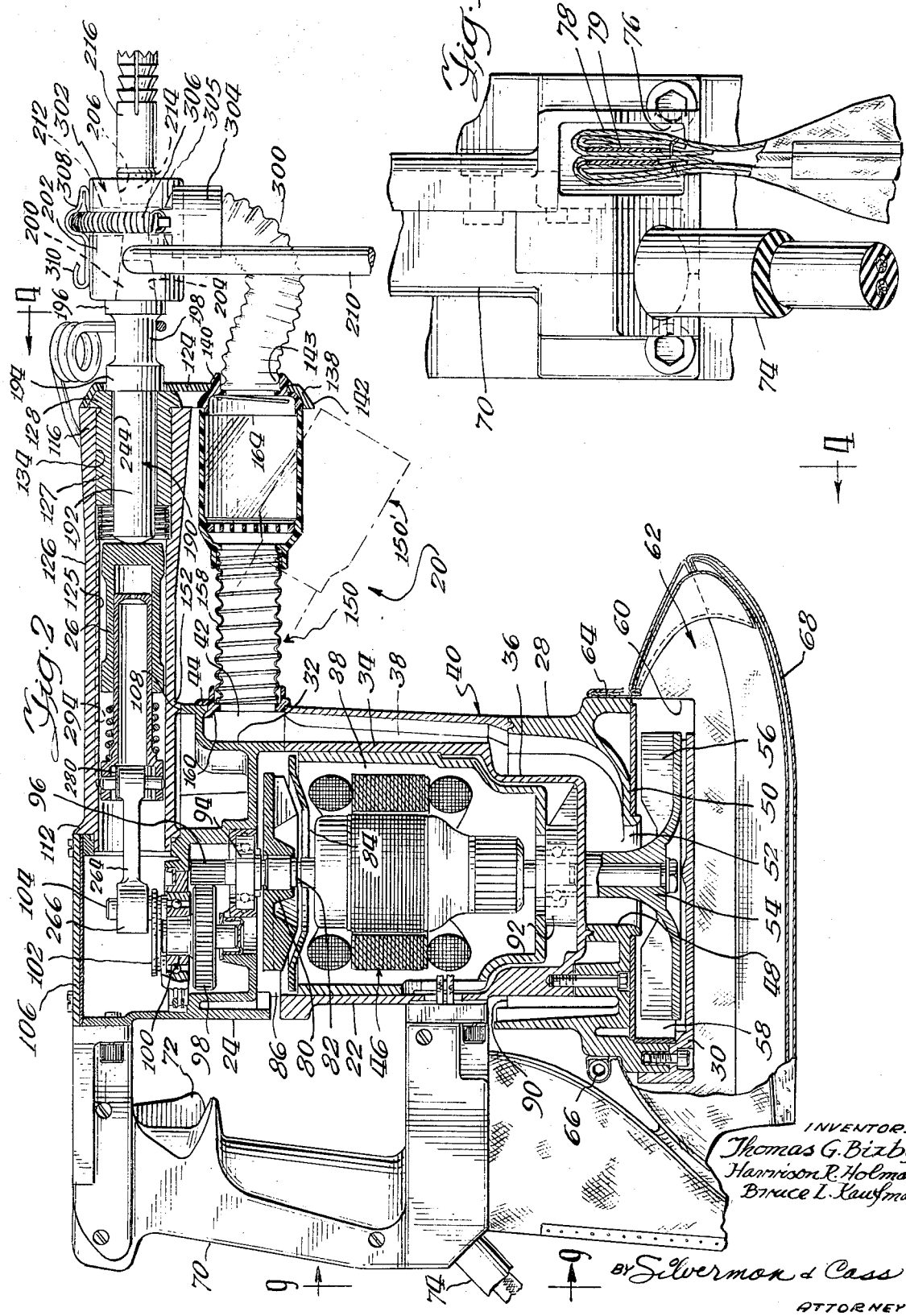

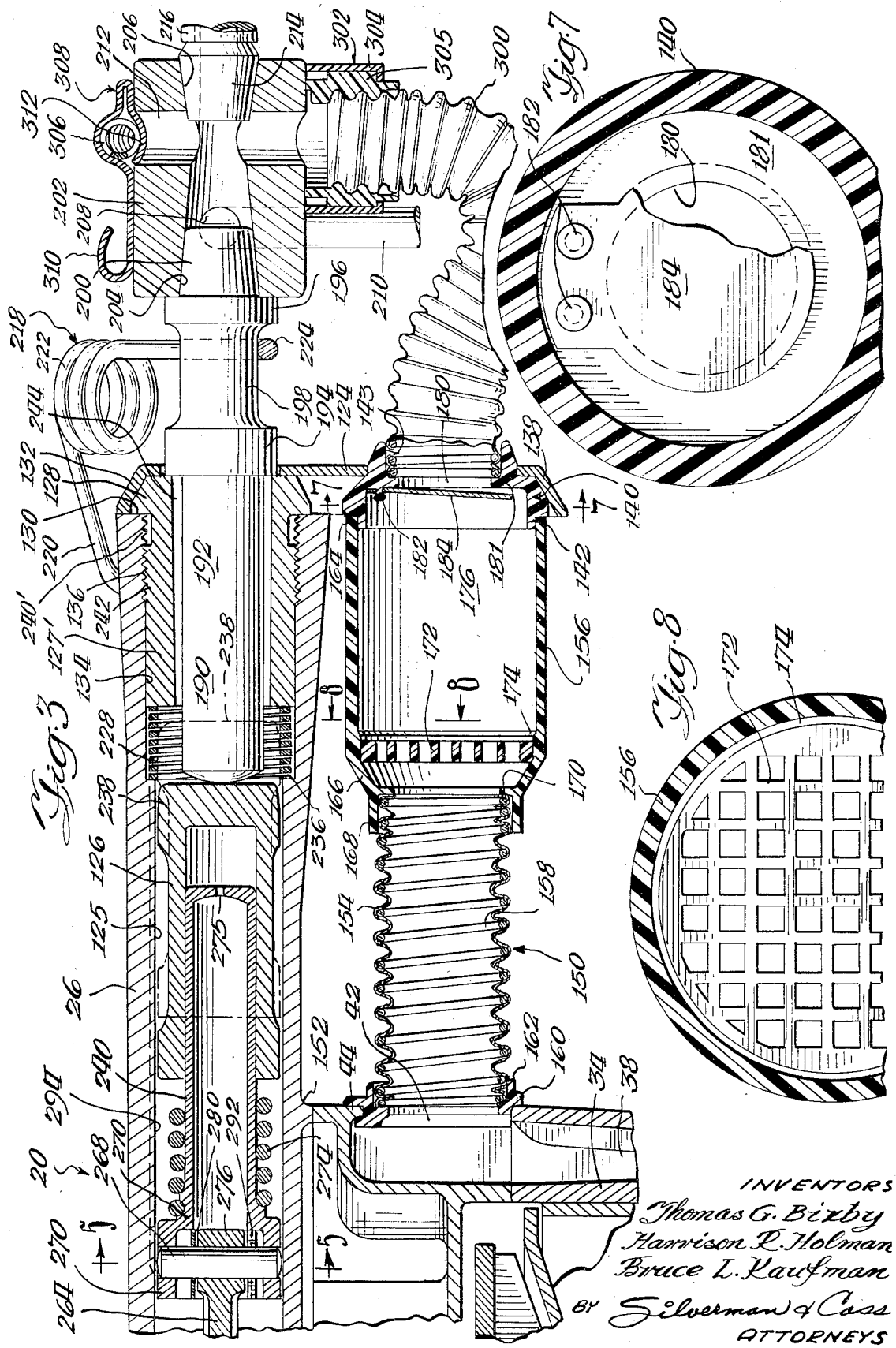

INVENTORS
Thomas G. Bixby
Harrison R. Holman
Bruce L. Kaufman
BY Silverman & Cass
ATTORNEYS

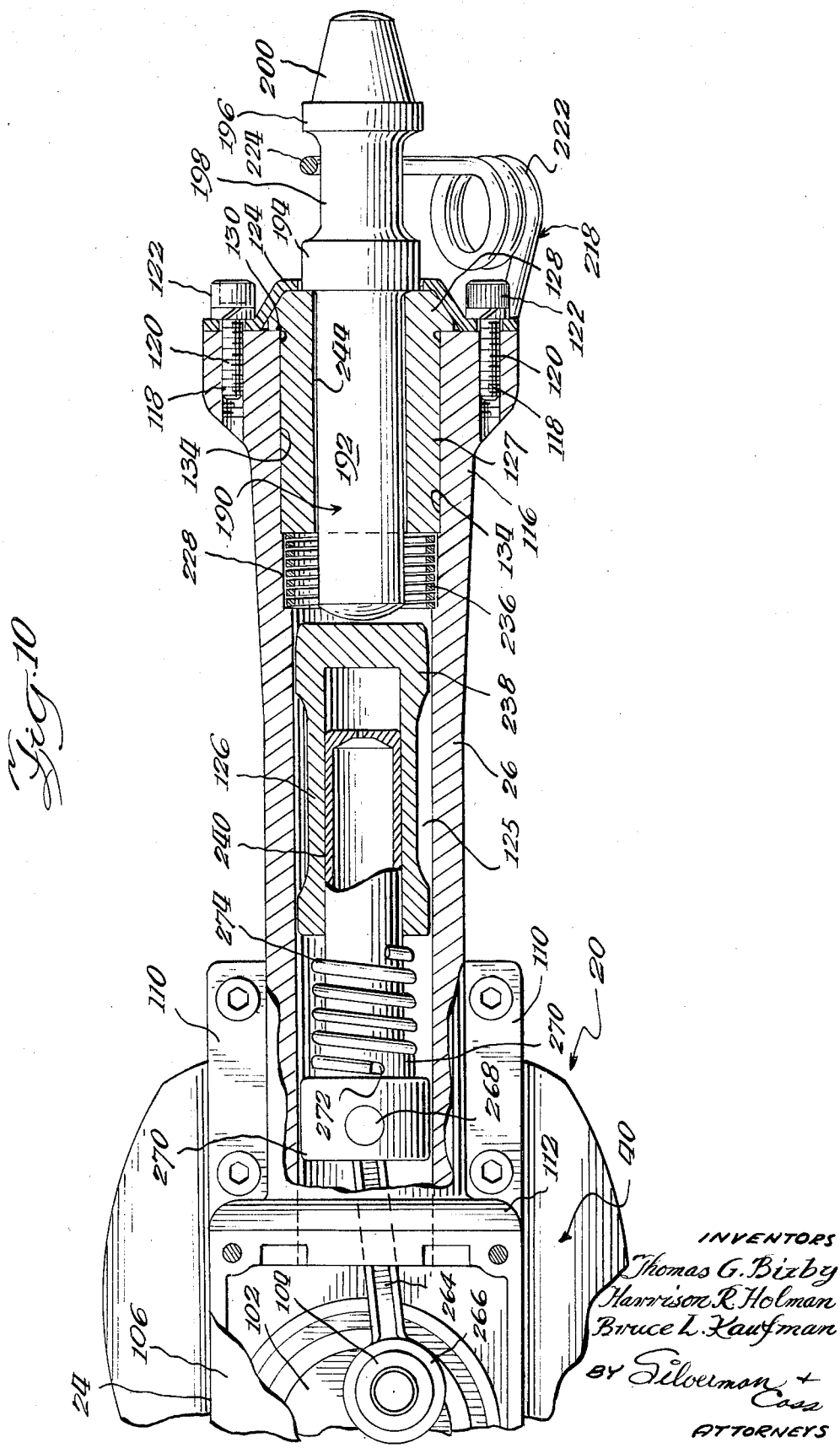

United States Patent Office 3,511,322
Patented May 12, 1970

3,511,322
PERCUSSIVE HAMMER WITH VACUUM SYSTEM FOR CLEANING DEBRIS FROM WORKPIECE
Thomas G. Bixby, Valparaiso, Bruce L. Kaufman, Michigan City, and Harrison R. Holman, South Bend, Ind., assignors to Phillips Drill Company, Michigan City, Ind., a corporation of Illinois
Filed Sept. 14, 1967, Ser. No. 667,812
Int. Cl. B25d 17/14; E21c 3/00
U.S. Cl. 173—75                  13 Claims

ABSTRACT OF THE DISCLOSURE

A percussive hammer of the type which has a vertically oriented motor and a barrel mounted adjacent the top of the motor housing and connected therewith having the barrel axis normal to the axis of the motor. The hammer having a reciprocating ram for applying repeated blows to a tool which is mounted in the free end of the barrel with the tool shank extending inwardly to present its interior axial end to the ram. The ram being pneumatically coupled with a crank-operated piston, the crank being driven by the motor. An impeller connected to the bottom end of the motor shaft and an impeller chamber formed in the interior of the housing with the impeller rotating therein to produce a vacuum at the chamber entrance and a high pressure at the outlet port of the chamber. A cloth bag connected to a handle secured in turn to the housing, the bag having internal connection with the outlet port of the chamber and having an opening which is normally closed by being pressed into a slot formed in the handle, but readily opening by sliding the lips of the opening out of the slot. An interior debris passage disposed generally vertically and interior of the same housing that carries the motor, with its bottom end connected to the chamber entrance and opening out of the housing at the root of the barrel and spaced below the same. An end bracket on the barrel end which holds the tool shank guide in the barrel and alos provides support for a debris pipe which connects from the debris passage opening to the bracket. The pipe is flexible and extensile and biased to hold itself removably in position with one end against the pipe support and the other end secured to the debris passage opening. The pipe may be flexed laterally to give access to its interior and has a sieve for catching rubble during use of the hammer. From the opposite side of the support a second flexible pipe extends to the work piece to suck the debris from the work while the hammer is being used.

The interior of the hammer has a ram arrester in the form of a helical coil of wire capable of being expanded and elongated, the coil being cylindrical in configuration and formed of rectangular wire to present a flat surface on its interior. The ram end is normally outside of the spring when a tool shank is in the end of the barrel but will engage into the spring when the tool shank is removed, the ram having a tapered nose to pilot its movement, and thereafter being held in place and out of coupled relation with the piston until once more a tool shank is inserted and pushes the ram end out of engagement with the spring.

The tool shank bushing and ram arrester are both mounted in a suitable seat which is formed interior of the barrel adjacent its front end, both being removable from the end, but held in place by the bracket which is turn is secured to enlarged lateral formations provided on the barrel adjacent its front end. The bushing may be engaged by a threaded connection or a simple slide fit. Modifications of said bushing are provided.

Other structures include vents cast into the barrel to prevent air lock and a novel wrist pin clip.

BACKGROUND OF THE INVENTION

Field of the invention

The principal use for structures which are made in accordance with the invention is the installation of self-drilling anchors which are to be secured to masonry, concrete or the like. This use is not to be considered a limitation of the invention, since the hammer of the invention is capable of much broader application, but the structure has been devised with this particular purpose in mind.

In understanding the invention, it is believed advisable to describe the manner in which self-drilling anchors are installed. The conventional self-drilling anchor is a hardened hollow cylindrical steel member with a plurality of axial teeth at one end and a weakened tapered formation at the opposite end. Broaching teeth and axial cuts on the toothed end aid in the expansion. The tapered formation is inserted into a chuck which is mounted on a shank that is in turn inserted into the end of the percussive hammer. The chuck a handle or bail connected therewith which is grasped by the workman. He presses the toothed end against the concrete surface, holding the the trigger alongside of the handle. The bail is in his hammer by its handle in his right hand, his finger on left hand. When he presses the trigger, the motor drives the hammer. Repeated blows are made against the shank end on the interior of the hammer by means of a so-called floating ram. The toothed end cuts into the concrete, and while this occurs the workman swings the bail back and forth in an arc which oscillates the anchor as it cuts.

During the cutting process, the concrete is chipped and broken away, producing dust for the most part, but also some larger pieces. In this specification, the dust and small granular pieces are referred to as debris, and the larger pieces are referred to as rubble. The anchor being hollow, the debris and rubble will pass up the hollow and into the chuck. The chuck has a transverse passageway which communicates with the chucked end of the anchor so that the debris and rubble will pass out of the open ends of this transverse hole. This same transverse passageway has another function which arises after the anchor has been installed.

In this manner, the workman drills the hole in the concrete or masonry until the anchor has entered the surface to any desired depth, usually to the face of the chuck. At this point, the workman withdraws the anchor still engaged in the chuck and blows the dust and debris out of the drilled hole with a suitable squeeze bulb. He inserts a short hardened steel plug in the toothed end of the anchor, re-inserts the anchor into the hole, pulls the trigger of the hammer, but doesn't oscillate the chuck. The plug is driven into the toothed end of the anchor, splitting and expanding the anchor end on the interior of the hole, while undercutting the sides of the hole. When the anchor has been fully set, the workman gives the hammer a sharp lateral movement, breaking off the tapered end inside of the chuck and exposing the hollow interior of the anchor, which is threaded to receive a bolt therein.

In order to discharge the broken end, the workman inserts a drift pin into the passageway described above as providing the discharge for the debris and rubble and forces the said broken end out of the chuck. The hammer is then ready for the next anchor.

The principal problems which the invention is intended to solve are connected with the production of debris and rubble during the use of the hammer. Ancillary problems arise when one attempts to avoid dust and debris by some practical means, and the invention admirably solves these ancillary problems.

The hammer construction is another aspect of the invention, and although the novelty pointed out hereinafter came about in the construction of a hammer and vacuum system, it is applicable to hammers which do not necessarily use a vacuum system.

The debris and rubble which move up to the bore of the anchor during drilling must move by gravity in the case of overhead installations, or by the pressure of additionally produced debris and rubble in floor or wall installations. This movement is slow and labored in any case, and the bore of the anchor readily clogs which necessitates periodic removal of the anchor from the partially drilled hole in the attempt to dislodge the clogged material. The drilling also proceeds in the presence of debris and rubble, the efflux of this material being accomplished by brute force since there are no flutes as in the case of many solid drills.

Additionally, dust is not fully removed. It binds the outside of the anchor within its hole; it pervades the atmosphere in the vicinity of the installations; it permeates the clothing of the workman; it filters into the hammer mechanism and produces inordinate wear; it is a consumate nuisance. All of this is added to the discharge of the debris and rubble from the chuck which is undesirable. The holding power of the self-drilling anchor is greater than that of any other concrete anchoring device, and the fact that the anchor drills its own holes no doubt are the principal reasons that users suffer the dirt and discomfort.

The invention has a vacuum system built into a hammer so that the dust and debris and rubble are drawn from the workpiece during use of the hammer, providing cleanliness and comfort, but even more important, materially increasing the speed of drilling and the ease of installation.

An important object of the invention is to provide a precussive hammer in which the hammer ram is driven by a pneumatic coupling with a motor-driven piston, this hammer having a motor housing with a built-in vacuum chamber and an impeller driven by the bottom end of the motor, sucking debris into a fabric bag secured to the housing, readily emptied, and easily carried as a part of the handle and housing.

The motor housing is extremely compact and light weight, by virtue of the construction to be described.

The housing has a laterally positioned passageway connecting at its bottom with the impeller chamber and opening at its upper end to the front of the housing directly below the root of the hammer barrel. In this way, no dust or debris can get into the hammer mechanism and the assembly of the motor housing parts automatically provides the vertical debris passageway on its interior.

Another feature of the invention is the means for bringing the debris to the passageway in the housing. In this gard the hammmer differs from all others by having a pipe or conduit which is parallel with and spaced below the barrel. One end connects to the housing at the opening formed therein, and the other is mounted to a plate or bracket which is secured to the front end of the barrel. Thus, the pipe or conduit may be made flexible and detachable so that it can be cleaned, and conveniently a rubble catcher having a sieve is interposed in it. The workman can empty this with a quick and easy movement. This pipe or conduit it preferably formed of wire-enforced plastic material, economical and easily replaced.

An object of the invention is to provide a novel connection from the hammer to the work-piece, and this preferably is in the form of another flexible pipe having one end connected to the outside of the plate or bracket in alignment with the first pipe, the other end of the second pipe being suitably connected to the workpiece. A practical structure is one in which there is a shroud or cap enclosing the chuck at the location of the openings of the transverse passageway, this shroud being connected with the pipe so that the debris, dust and rubble are sucked out of the chuck and the bore of the self-drilling anchor.

Important objects of the invention are concerned with the achievement of light-weight, compactness, ease of accessibility and service, and economy of manufacture of a device of the character described, and these objects are achieved by the structure which will be described and claimed hereinafter.

As mentioned above, the internal construction of the hammer is also the subject matter of the invention. A novel ram arrester is described and claimed, this being in the form of a simple helical coiled spring interior of the barrel which is engaged by the tapered nose of the ram when the tool shank is removed to prevent the ram from beating the tool shank bushing and the end of the hammer barrel. The ram arrester and the said bushing are set into the end of the barrel in a suitable seat and are removable from the forward end of the barrel. The bracket or plate which has previously been mentioned, and which also serves to support the debris conduits, is secured to the front end of the barrel over the axial end, and this securement also locks the bushing and ram arrester in place. Alternate bushing structure provide a simple fit and a screw threaded fit as well as novel mounting for the shank of the hammer.

Many other objects will become apparent from the description of the preferred embodiments. The enumeration of objects above is not to be considered limiting.

The prior art

The use of vacuum systems with percussive hammers is well-known, and the invention herein is not directed to that concept per se. The advantages achieved by applying a vacuum to the work-piece are believed achieved to a higher degree of effectiveness than heretofore, because of the particular construction which is described and claimed.

As for vacuum systems, it has been known to use rock drills and the like in which the dirt and debris are intended to pass up the center of the drill, but this arrangement is troublesome and causes the mechanism of the drill to wear out faster. Typical arrangements showing this type of structure are disclosed in U.S. Pat. 2,969,846, 2,643,641 and 2,919,901.

In some instances, the vacuum has been applied directly to the workpiece by some form of cover or shroud which connects to a separate source of vacuum, such as a vacuum cleaner. This structure is disclosed in U.S. Pats. 1,084,152, 2,990,024, 3,131,947 and 3,220,742. External pipes are cumbersome, get in the way of the workman, and can be expensive. The invention has a built-in source of vacuum, has the separate but built-in debris passageway, has the short parallel debris pipe mounted out of the way under the barrel, and provides a short and convenient pipe from the front of the hammer barrel to the workpiece.

Typical self-drilling anchors of the type to be installed by the hammer of the invention are disclosed in U.S. Pats. 1,996,121 and 1,621,598.

With respect to percussive hammer construction, per se, reference may be had to U.S. Pats. 2,260,070, 2,260,-172, and 2,013,296 which relate generally to the same type of construction as utilized herein. A specific self-drill anchor installing hammer marketed for many years is disclosed in U.S. Pat. 1,968,055.

SUMMARY OF THE INVENTION

While the claims will be depended upon to furnish statements which represent the invention in all of its facets as contemplated, a short statement at this point may assist in an understanding of the thrust of the specification, if not actually comprising a technical summary thereof.

The principal features of the invention revolve around a type of percussive hammer in which there is a vertically oriented motor and motor housing having means for mounting a horizontal barrel thereon with structure for securing a drilling tool removably from the barrel. This type of percussive hammer is known, but lends itself well to the invention. According to the invention, the housing is built with an internal passageway that extends between an opening just under the root of the barrel where it joints the housing, the bottom end of the housing where there is an impeller chamber formed. The bottom end of the motor has an impeller secured thereto and rotating in the chamber to create the low pressure in the passageway which is intended to draw the debris into the impeller chamber. There is a foraminous bag on the bottom of the housing which receives the discharge from the chamber and has an opening that is caught into a slot in the lower part of the handle of the hammer. Thus, the opening, which is normally folded closed, can be slipped out of the slot opened and the bag emptied.

The structure described thus far above is not significantly larger in space occupied than most percussive hammers and the result is a highly efficient, light weight and compact hammer with short passageways for the debris, and with easy access to all parts of the hammer and the system.

The barrel of the hammer has a bracket at its front end that serves several functions. Primarily it provides depending support means which mounts a structure that holds two pipes. One pipe is arranged below the barrel and parallel therewith, extending between the opening mentioned above and the bracket. This pipe is flexible and removable and has a rubble catcher therein of novel construction which may be emptied from time to time. The second pipe is connected to the outside of the mounting structure, and is a continuation of the first pipe, being flexible and extending to a form of shroud which engages the chuck at the end of the tool. The shroud forms a closed cavity around the chuck at the debris discharge openings and since the low pressure of the impeller chamber is felt throughout the lengths of the two pipes and at the the shroud, the resulting vacuum sucks the debris and rubble into the system.

Other functions of the bracket are to retain the tool shank bushing in the end of the barrel in certain embodiments of the invention, and to serve as limiting means for the shank in certain cases. The shank passes through an opening in the bracket.

The invention includes novel internal structure in the hammer including a novel ram arrester; novel tool shank bushings and mountings therefor; novel means for securing the wrist pin to the connecting rod.

BRIEF DESCRIPTION OF THE DRAWINGS

FIG. 1 is a side elevational view showing a percussive hammer constructed in accordance with the invention, in use, said percussive hammer having a tool, chuck and self-drill concrete anchor member mounted in association therewith.

FIG. 2 is a median sectional view of the same, with portions in elevation.

FIG. 3 is a fragmentary sectional view on an enlarged scale of a portion of the structure of FIGS. 1 and 2 but showing a modified form thereof.

FIG. 7 is a sectional view taken generally along the line 7—7 of FIG. 3 and in the direction indicated.

FIG. 8 is a fragmentary sectional view taken generally along the line 8—8 of FIG. 3 and in the direction indicated to illustrate the rubble sieve.

FIG. 9 is a view taken generally along the line 9—9 of FIG. 2 looking toward the rear of the handle of the hammer.

FIG. 10 is a fragmentary sectional view taken through the hammer generally on a horizontal plane 10—10 of FIG. 4 with portions shown in plan to illustrate details of a modified form of the invention.

FIG. 11 is a sectional view of a portion of the forward end of the hammer showing still aonther modified form thereof.

DESCRIPTION OF PREFERRED EMBODIMENTS

Figure 4:
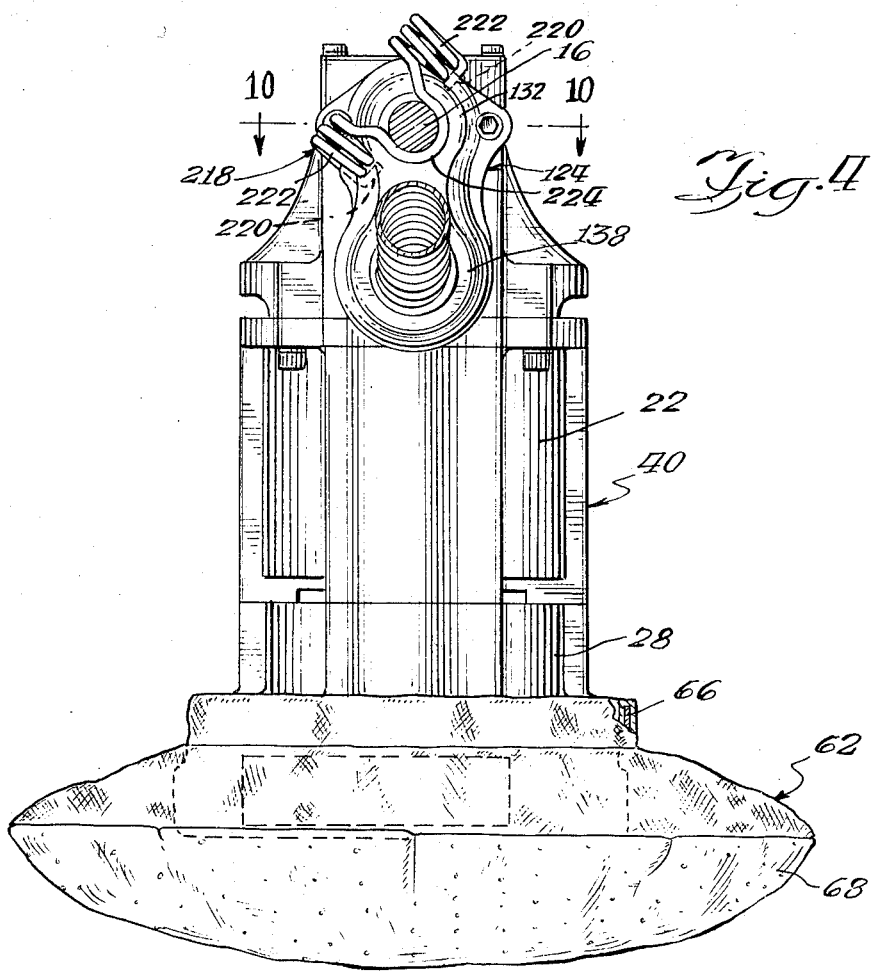
FIG. 4 is a sectional view taken generally along the line 4—4 of FIG. 2 and in the direction indicated.

In U.S. Pat. 1,968,055 which has been referred to above as prior art, a percussive hammer is described whose principal purpose was the installation of the self-drill concrete anchors of the break-off variety. It will be obvious from the disclosure therein that the construction of the hammer is robust, and the reason is that hammers of this type are subject to enormous stress. It requires substantial energy to cause a concrete fastener of the order of 1⅛ inches in diameter to drill a hole in concrete by percussive blows. Every part of the hammer is subject to stresses which would render normal tools of this size useless in short order. It is to be remembered that the percussive hammer contemplated herein is a small portable device intended to be carried in a small container by a workman from place to place on a job. No comparison should be made with large rock drills and jack hammers used in mining and the like, these latter devices usually being operated by compressed air and in many cases having support structures for holding the same during use, if not permitted to support themselves in floor operation.

Nonetheless, the structure of the invention accomplishes in a large measure that which would be expected only of a much larger and heavier device. The lightness of weight and compactness are a direct result of the novel structure, and the efficiency has been improved to such an extent that the device weighs not appreciably more than the commercial versions of the percussive hammer of U.S. Pat. 1,968,055 while providing the novel vacuum system resulting in completely clean and dust-free use.

The hammer is designated generally by the reference character 20 and it is formed of several components, each of which will be described in detail.

The hammer comprises a vertical motor housing 22 surmounted by a gear housing 24 having a connecting orizontal barrel 26. At the bottom end of the housing 22 there is a connecting structure 28 formed as a continuation of the housing 22, to the bottom of which there is secured a cover or cap 30.

Considering the overall structure, the parts 22, 24, 28 and 30 could be formed differently and assembled differently. The particular parting junctions, fastening means, and the method of connecting them together are a matter of engineering design, but the results and the passageways and chambers resulting are considered essential to the novelty of the invention, however formed. It will therefore be appreciated that when reference is made in the claims to a motor housing it may comprise one or more pieces secured together or formed of several components, such as for example, the part 22, the part 24 and a portion of the part 28. When reference is made to means forming an impeller chamber, this could comprise the part 30 and a portion of the part 28, and so on. The structure illustrated is believed to be the best mode of building the hammer, since it is economical and easy to manufacture, especially using die casting or molding techniques. Aluminum alloy is preferred for the upper pieces, and where electrical connections are made, high impact thermosetting resins are preferred to provide so-called double insulation to meet Underwriters' Laboratories specifications.

The walls of the housing 22, the gear housing 24 and the lower connecting part 28 are formed with suitable partitions and webs, such as shown at 32, 34 and 36 as a result of which there is a vertical passageway 38 provided which is disposed in the forward part of the motor housing.

For ease in referring to the strucutre generally, the composite motor housing will be given the reference character 40. This vertical passageway has an upper opening or entrance at 42 which is formed by suitable structure molded in the gear housing 24, and preferably a flange 44 provides a defined hole in the upper forward end of the housing 40. This hole is directly under the point along the length of the barrel 26 at which it joins the housing 40, and this is called the root of the barrel. As will be seen, the physical structure forming the barrel extends to the left beyond its root, but again this is a matter of good design, since it is possible for the barrel to begin just above the hole or entrance 42. Certainly, in profile, the barrel appears to commence at the point which is its root.

At its lower end the passageway 38 has a portion which curves and tapers radially inward, considering the axis of the motor 46 as the axis of the motor housing 40. This portion is formed by web and partition structure such as indicated at 48 and 50 and it forms an annular entrance 52 about the shank 54 of the impeller 56. The impeller chamber mentioned above is shown at 58 and the chamber is of annular configuration to provide suitable housing for the rotation of the impeller 56. One side of the chamber 58 is open as shown at 60 and a bag 62 envelops the lower end of the housing 40 and receives the discharge from the opening 60. In the claims, the bag is referred to as a debris catcher.

The bag 62 has a large opening formed in its upper part as shown at 64 and this opening is clamped to the housing 40 by any suitable means such as a metal hose clamp 66. The bag is canvas so as to be porous, and has an overlay of perforated synthetic material such as plastic, as shown at 68. The air taken into the bag with the debris will pass through the pores, retaining the debris inside of the bag. The plastic cover 68 serves as a shield to prevent wear of the bag, since the entire hammer will be set down upon its bag from time to time and the cover may be made of tough long-wearing plastic sheeting.

A handle 70 with its trigger switch 72 is secured to the hammer housing 40, the upper end being attached to the gear housing 24 and the lower end being attached to the housing 22. The electrical extension cord 74 is brought into the housing 40 through the lower part of the handle 70 to energize the motor 46, and also the lower end of the handle has a groove or slot formed therein as shown at 76. The bag has another opening at its rear end whose lips 78 are folded together as shown in FIG. 9 and slipped into the groove to keep the bag 62 closed during use of the hammer 20. When the bag is to be emptied, the folded lips 78 are withdrawn from the slot in the handle, separated and the bag emptied. Stiffeners 79 of metal or plastic are sewn into the lips 78 of the bag 62.

The motor 46 is of conventional construction, and has a fan blade 80 secured to its upper shaft 82 rotating in a space provided between the gear housing 24 and the housing 22. The housing 22 has central openings at 84 and the junction between the housings 22 and 24 provides vents at 86 so that air may be drawn through the motor chamber 88 for cooling purposes and discharged by way of the vents 86. Air is admitted to the bottom of the chamber 88 by way of inlet ports 90 or through any other suitable means, in any conventional manner.

The lower motor bearing is shown at 92 and the upper bearing 94 is preferably mounted in the gear housing 24. A small pinion gear 96 on the shaft 82 drives a helical gear 98 journalled at 100 and this in turn rotates a crank wheel 102 that carries the crank pin 104. Access to the crank wheel and the upper mechanism is achieved through an access plate 106 mounted at the very top of the housing 40 on the housing 24. The forward end of the housing 24 provides a seat 108 for the rear end of the barrel 26, the barrel having lateral flanges 110 which are bolted to this seat, and the barrel end having a bearing flange 112 which engages flush against the face of the upper part of the housing 24, as best shown in FIGS. 2 and 10.

The barrel 26 has the percussive mechanism which shortly will be described, but for the moment attention is invited to the forward end of the barrel which is relatively thick or heavy, as shown especially in FIG. 10. Looking from the side, this position which is designated 116 is somewhat flared top and bottom, but looking down at it from the top the portion 116 is of sufficient bulk to provide threaded sockets 118 for reception of the machine screws 120 whose heads 122 engage upon and secure a bracket member 124 to the forward end of the barrel 26. The barrel 26 is normally a casting and machined internally as well as externally wherever required to adapt it to the assembly with the remaining portions of the hammer 20. The interior of the barrel 26 is hollow providing a chamber at 125 within which a ram 126 reciprocates in a manner to be described. At its forward end the hollow interior or bore of the barrel 26 provides a seat for a bushing.

Three different varieties of bushings are described and illustrated, and the structural details thereof are to some extent interchangeable depending upon certain modifications made to the barrel. In each case there is a bushing in a seat held in place by the bracket 124. This bushing may be called the tool shank bushing since it guides the shank of a tool disposed in the end of the barrel.

There are three different types of bushings illustrated in the drawings, these being the bushings 127 shown in FIGS. 2 and 10, the bushing 127' shown in FIG. 3, and the bushing 127" shown in FIG. 11. In each case the bushing has an enlarged annular head somewhat chamfered as shown, such head in every case being designated 128 and overlying the flat axial end of the barrel 26, it being considered that the axis of the barrel is the center thereof extending right to left in all pertinent figures. This surface 130 is machined perfectly flat, and the bracket 124 in each case has an arcuate conforming configuration 132 into which the respective annular head 128 will nest. In each case the screws 120 clamp the bracket 124 against the end of the barrel 26 to hold the bushing in place.

The only bushing illustrated which does not require such securement means is the bushing 127' illustrated in FIG. 3. In this case the seat 134 which is formed in the end of the barrel is threaded as shown at 136 to cooperate with a suitable thread formed on the bushing 127' so that the bushing may be screwed into the end of the barrel not depending upon the bracket 124 for its securement. In all other respects the seat 134 which is provided at the end of the chamber 124 is similar. Synthetic resin inserts may be used in association with bushings such as 127' to provide a locking connection.

The bracket 124 in each case has a depending collar or perforated formation 138 at its bottom end spaced from the barrel 26 and a support ring 140, preferably of synthetic resinous material such as plastic, is mounted in said formation 138. On its interior, that is to the left of the bracket 124 as seen in FIG. 3, there is an external seat 142 while on its exterior, that is to the right of the bracket 124, there is an internal seat 143 formed. The formation 138 is aligned with the opening 42 so that a pipe designated generally 150 may extend between the opening 142 and the formation 138.

Considering generally the structure just described in detail, the conduit 150 is a debris conduit which enables the passage of debris and rubble from the opening defined in the support ring 140 (described in more detail below) to the opening 42. Rubble may be captured in a suitable sieve if desired, and indeed, this is preferred. In the claims which are appended hereto, reference is made to this conduit as being connected with the opening 42 and having a support connection with the barrel 26 at the second end of the conduit. This support connection is provided by the bracket 124, and the seocnd end of the conduit 150 is the right hand end as viewed in FIGS. 2 and 3. It will be noted that the conduit is substantially parallel with and spaced below the barrel 26 and that the opening 42 is located at the juncture 152 of the barrel with the housing 40, this being referred to as the root of the barrel, since in profile, it appears that the inner end of the barrel terminates at this point, although in fact the barrel extends a substantial distance to the left of this point.

In the structure illustrated, the conduit 150 is made up of two principal parts, a flexible extensile pipe portion 154 and a relatively stiff cylindrical portion or member 156 of diameter larger than that of the flexible part. The flexible pipe portion 154 is preferably formed of some tough synthetic resin and has an internal spiral wire support member 158 braced or molded in place. This form of flexible hose with wire support is available commercially and has the advantages that it retains its shape, is extensile and flexible. The opening 42 has a plastic ring insert 160 formed with an integral socket 162 secured to the flange 144. The left hand end of the flexible pipe portion 154 is engaged in the socket 162 and preferably is cemented in place. Since the ring insert 160 and the walls of the flexible pipe portion 154 are of synthetic resin, suitable solvents or adhesives will be available for achieving a good bond.

The cylindrical member 156 is also formed of synthetic resin, but is stiff. It is of such diameter at its entrance 164 to engage over the external seat 142, while its left hand end is tapered as shown at 166 to a cylindrical extension 168 whose inside diameter is of such dimension as to enable the right hand end of the flexible part 154 to telescope therein. The resulting joint preferably is bonded by suitable adhesive, there being an annular interior ring formation 170 to limit axial movement of the flexible part 154 into the cylindrical portion while assembling the same. A circular sieve 172 is set into the left hand end of the interior of the cylindrical member 156 and locked in place by any suitable means. The sieve will prevent larger pieces of debris, called rubble in this specification, from passing into the flexible pipe 154 and thence into the vertical passageway 38. The chamber 176 formed on the interior of the cylindrical member 156 thus becomes a rubble accumulating chamber or trap, the size of the rubble being larger than pieces which will pass through the mesh of the sieve 172. Conveniently, the sieve is also made of synthetic resin and may be cemented in place so that the inner diameter of the chamber 176 is slightly larger than the seat formed for the sieve 172, giving rise to a slight taper formation at 174. This enables the sieve member 172 to be dropped readily into place, pushed home and held frictionally, if desired, or cemented in place.

This rubble trap will accumulate pieces as the hammer 20 is used, and need be emptied from time to time. The length of the conduit 150, if free from the hammer, that is, if the entrance end 164 is permitted to extend axially as far as it can due to the spring effect of the spiral wire member 158, is substantially greater than the distance between the entrance 42 and the seat 142. Accordingly, the right hand end of the conduit 150, which in the structure described is the only removable end, is axially pressed against the seat 142. To remove it, the workman grasps the cylindrical member 156 in his hand, pulls axially to the left as viewed in FIG. 3 until the entrance 164 is clear of the seat 142, then tilts the cylindrical member downward, spilling its contents into any convenient receptable. This condition is shown in phantom lines in FIG. 2 at 150'. This is such an easy chore, that it may be done each time an anchor has been caused to drill its hole, and several times in the case of larger anchors. Its size is such, however, that a considerable number of holes may be drilled without filling it.

On its interior, the plastic support ring 140 has an opening 180 formed in an integral flange 181, there being a pair of integral plastic buttons 182 at the top of the flange which are engaged through suitable perforations of a flapper valve member 184 whose right hand surface engages the left hand face of the flange 181 and normally has sufficient resilience to block the opening 180. The button ends are mushroomed over the member 184, by heat and pressure. When the hammer is operating, the vacuum exerted will pull the flapper valve member 184 off its seat to permit debris and rubble to enter the chamber 176. When there is no vacuum, and the workman is manipulating or carrying the hammer 20, the flapper valve member 184 remains in place to prevent any rubble which may have remained in the chamber 176 to gravitate to the workpiece.

Returning now to the explanation of the bushings 127, 127' and 127", these bushings in each case act as tool shank guides. The designation "tool shanks" will be accepted as the definition of the shanks illustrated and this is intended to include any other form of structure which may be retained and guided by the bushings, and irrespective of the number of pieces forming the same. Consider for example the structure shown in FIG. 2. There is an adapter member 190 having a straight cylinder shank portion 192, a collar 194 that engages against the exterior axial face of the flanged end 128 of the bushing 127, a second axially spaced collar 196 which provides a neck 198, and a tapered end nose 200. The nose 200 is frictionally engaged in a suitable socket formed in the chuck 202. A better view of this structure and connection is seen in FIG. 3.

The chuck 202 has the tapered socket 204 at one end and a second tapered socket 206 at the other end. Oppositely opening sockets 208 seat the spaced inner ends of a bail 210 which is to be grasped by the workman as shown in FIG. 1 to enable the chuck 202 to be oscillated while the hammer is being used. A transverse passageway 212 intersects the socket 206 so that when the tapered break-off end 214 of the self-drill anchor 216 is inserted, it will protrude into the passageway 212. After the anchor has been set and the end 214 broken away from the anchor, a drift pin (not shown) is introduced into the passageway 212 and the broken off end 214 is forced out of the sockeṫ 206 and discarded.

The purpose of the neck 198 is to enable the adapter member 190 to be retained during the use of the hammer without being forcibly ejected during operation of the ram 126. The neck 198 is a part of an external lost motion connection. A retainer spring 218 has a pair of hooked ends 220 engaged in suitable sockets (not shown) provided in the thickened portion 116 of the barrel 26, coils 222 on opposite sides of the necked portion 198, and a transverse yoke 224 connected between the coils 222 and engaging the neck. The construction and lost motion operation of this kind of retainer spring 218 is well known. This use of the phrase "lost motion" is for convenience to describe the relative movement of yoke 224 and adapter member 190.

The components 190, 202 and 216, comprising the adapter, chuck and anchor all work together when the hole is being drilled by the hammer, and insofar as function is concerned, the combination comprises a tool, mounted in the hammer barrel end. Accordingly, it will be understood that the definition of the bushing 127, 127' or 127" as a tool shank bushing is correct. As a matter of fact for a considerable period of time before the present, most structures for installing self-drill anchors had the chuck and adapter connected as an integral member. Likewise, if the hammer 20 were to be used with a drilling tool of some kind which was not a self-drill anchor, all three components could well be a single member.

In the case of the structure of FIG. 10, including the bushing 127, at the inner end of the seat 134 there is a second cylindrical seat 228 which may be of a different diameter than the seat 134, but conveniently may be slightly smaller to enable the seating of the ram arrester spring 236. The ram arrester spring preferably is a relatively stiff closely coiled helical spring made of square wire, but providing sufficient yielding to expand and elongate slightly when the ram nose 238 engages therein in the case the shank 192 has been removed. When the ram 126 is driven forward as will be explained, it will normally engage against the end of the shank 192 and hammer it. The movement of the shank in and out of the barrel 26 will be confined by the operation of the spring 218. If on the other hand the adapter is moved all the way out, or removed entirely, the starting up of the hammer will cause the ram to beat against the end of the bushing unless some means is provided to prevent this.

What happens when this occurs in the structure shown is that the tapered nose 238 of the ram 216 is driven into the spring 236 with the first blow and is frictionally engaged and held there. The interior coil surfaces of the ram arrester spring 236 present a relatively flat tapered surface to the nose 238 and expand conically to conform to the configuration of the nose. Preferably the diameter of the seat 228 should be such that there is no interference between the spring 236 and the seat with the ram 126 caught therein. When the workman starts the hammer 20, with an anchor in place, if installing the same in a floor for example, where the weight of the anchor, chuck and adapter would tend to pull the shank 192 out of reach of the ram 126, instead of damaging the end of the bushing 127, the ram 126 is caught and the piston 240 reciprocates freely independently of the ram 126. As soon as the workman presses the tool combination against the work, he moves the shank 192 inwardly pressing the ram 126 out of the arrester spring 236, and the pneumatic coupling between piston 240 and ram 126 is effected for hammering purposes.

The shank 192 being perfectly cylindrical, may be readily slipped out of the bushing 127 in either structure illustrated in FIGS. 3 and 10 by pivoting the retaining spring 218 about its connection with the barrel 26 to remove the yoke 224 from its position holding the adapter in place. As a general rule, users will have chucks and adapter joined for the different sizes of anchors used, and will thus change the entire combination rather than try to remove the chuck 202 from its adapter for replacement with a chuck which will take a different size of anchor.

In the case of the bushing 127, removal of the bracket 124 enables the bushing to be slipped out of the barrel 26. In many cases this is an excellent arrangement, since replacement for wear and breakage is a simple matter. Some care must be taken to assure that the bracket 124 is sufficiently robust and is secured with proper fastening means to withstand the beating and hard use to which it is subjected. Nothwithstanding the ram arrester 236 there will be blows upon the end of the bushing from time to time, and the very nature of the percussion carried on by the hammer is bound to place a strain upon the screws 122 for example.

The bushing 127' depends primarily upon a purchase in the bore of the barrel 26 afforded by a threaded connection. Thus, the bore is tapped as at 240' and the bushing is threaded as at 242 so that the bushing is screwed into the end of the bore of the barrel 26. A hexagonal socket 244 of a size sufficient to clear the shank 192 is formed in the bushing so that when assemblying the same, a hexagonal bar wrench may be used to tighten the bushing in place. Again, as in the case of the structure of FIGS. 2 and 10, the shank 192 readily drops out of the bushing if the retaining spring 218 is manipulated out of place.

In the case of the structure of FIG. 11, the bushing and adapter are somewhat different from those described. The bushing 127" in this case may be held in place by the bracket 124 and without the use of a threaded connection so that removal of the bracket is all that is required for the bushing to be removed. The adapter 190' is considerably modified as compared to the adapter 190. It still has the nose 200' for engagement with a chuck, a collar 194' for limiting inward movement of the shank 192' but note that it has no structure equivalent to the collar 196 and the necked section 198. A hammer using this structure does not have the retaining spring 218, the stroke of the shank 192' being controlled by a necked portion 246 that cooperated with a pair of hardened balls 248 set in radially extending, diametrically opposed channels or sockets 258 on opposite sides of the bushing 127". A suitable confining strap or split ring 260 holds the balls and shank 192' in assembly for manipulation when installing the same into the barrel. The left hand end, that is the inner end of the shank 192' has a nose 262 cooperating with the ram 126 in the same manner as previously described, and a ram arrester is also used.

It will be obvious that the structure of FIG. 11 is of a type not readily lending itself to quick change of the adapter 190' but would be advantageous for certain purposes. For example there might be those who utilize a single size of chuck and anchor in practically all of their work. It could likewise be used where the connection between the end 200' of the adapter 190' is readily disassembled from its chuck, most likely not having a tapered fit. A tapered fit will be quite tight and not easily separated. A complete drilling tool not frequently removed from the hammer would be ideally connected to the hammer in a manner utilizing the internal lost motion connection, as opposed to that of FIGS. 2, 3 or 10. Any external lost motion connection can be used, however, with other features of the invention.

Attention is now invited to the drive connection and pneumatic coupling between the crank wheel 102 and the ram 126. The crank wheel has a crank pin 104 to which is mounted a connecting rod 264 that extends through an opening in the front wall of the upper casting 24 into the barrel 26. At best seen in FIG. 10, the barrel end comes right up to the casting 24 and has the flanged part 112 engaged upon the wall through which the connecting rod extends so that the rod is adapted to be reciprocated in a rectilinear movement within the barrel end. A bearing 266 provides an anti-friction connection for the crank end, and the opposite end is connected with the piston 240 by means of a wrist pin 268. A cross head 270 integral with the piston affords this connection, and an extension of the cross head 270 between the elongate portion of the piston and itself forms a helical seat 272 to secure the coiled spring 274 thereon. This coiled spring 274 is the return spring for the ram 126, and it stores kinetic energy between movements of the ram to amplify the hammer stroke, in a manner described in the hammer patents mentioned above as prior art. Air relief hole is at 275.

Figure 5:
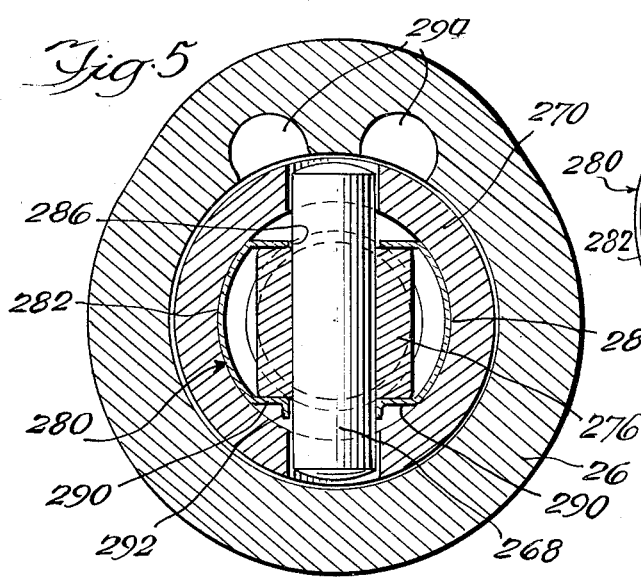
FIG. 5 is a sectional view through the wrist pin of the hammer taken generally along the line 5—5 of FIG. 3 and in the direction indicated.
Figure 6:
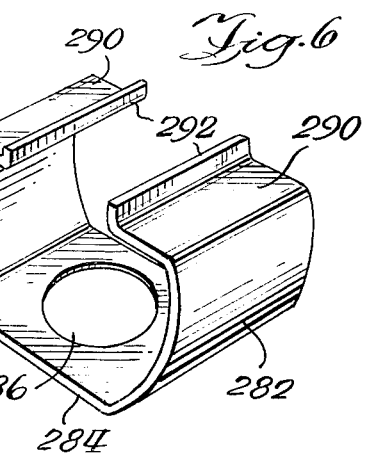
FIG. 6 is a perspective view of a wrist pin clip constructed according to the invention.

As seen in FIGS. 3 and 5, the cross head 270 is slightly smaller in diameter than the interior surface of the internal bore 125 of the barrel 26 so that it can reciprocate within the barrel when the crank wheel 102 rotates. The wrist pin 268 passes through the cross head 270, through the small end 276 of the connecting rod 264 and is held in place by means of a novel clip 280 best shown in FIG. 6. The clip has a generally open channel-shaped configuration, with the side walls 282 arcuate to conform to the interior of the hollow end of the cross head, the bottom wall 284 being perforated at 286 to clear the wrist pin 268, and the upper part having inwardly directed walls 290 having end flanges 292 bent up therefrom. These walls 290 define clamp edges. This clip 280 is preferably formed of spring steel, and the flanges 292 of the clamp edges 290 are spaced apart a distance somewhat less than the diameter of the wrist pin 268, so that when assembled, the wrist pin is forced into the connection springing the flanged clamp edges 290 apart. These edges thus become clamped frictionally to the wrist pin enabling the entire assembly to be manipulated with ease.

This clip 280 serves several important and novel functions. It centers the connecting rod in the cross head 270, since the cross head is hollow. The connection with the piston is thus also properly centered. It also retains the wrist pin in place in a simple and highly effective and economical manner. In other arrangements previously used, a slot was machined in the piston normal to the bosses which were intended to hold the wrist pin in place. Other arrangements were used, including many in which the wrist pin was free to move out of the cross head unless confined in the barrel. Obviously assembly of such a structure would be annoyingly difficult where the pin must be manually held in position while assembling the hammer. In the case of the structure described, the cross head is connected to the connecting rod by the wrist pin and clip, the ram is slipped over the piston, and the entire structure remains in the assembled relation while the barrel is slipped over the ram and moved into engagement with the casting 24. Otherwise, the wrist pin would readily fall out and pose considerable difficulty.

In FIG. 5 it will be noted that there are elongate grooves 294 cast into the interior of the barrel 26. These provide venting ordinarily achieved by grooving the ram or by forming radial holes in an inner barrel, where two telescoping barrels are used in some prior constructions. The casting of the grooves 294 when manufacturing the barrel is a substantial economy.

The only portion of the disclosure which has not been described in detail herein is that portion which relates to the structure and arrangement for leading of the debris and rubble from the workpiece to the conduit 150, and this will be set forth below.

As seen in FIG. 3, the resinous plastic ring 140 has an outwardly (that is, to the right) opening socket 143 which enables another conduit to be attached to the hammer. In the claims, this socket 143 is called a pipe socket, and reference is made to a flexible pipe adapted to be secured therein, or secured therein. The flexible pipe is shown in FIGS. 1 and 2 and is designated 300. It may be supplied with the hammer 20 when originally sold, in which case it is conveniently of the same general construction as the length of flexible pipe 154, that is, a plastic pipe with helical wire reinforcement. This kind of pipe or conduit is readily secured in the socket by means of cement or other bonding adhesive suitable for a plastic to plastic joint. Likewise, the hammer 20 may be sold by the manufacturer without the length of pipe 300 attached, leaving the user to provide his own connection or coupling to the workpiece. In such case, the socket 143 may be threaded or otherwise formed to enable some kind of conduit to be secured. One convenient way of providing for a connection would be to have a nipple instead of a socket 143, in which case a simple hose of some type may be secured over the nipple and held in place by a clamp or the like.

In any case, the opening 180 is the second end of the conduit 150, as defined in the claims, and this end is adapted to be coupled with the workpiece, referred to in the claims as the cutting tool, to apply suction to the tool during use of the hammer. The socket or nipple and the the connecting length of pipe or conduit from the bracket 124 to the tool comprise a portion of the coupling means.

Several structures for enabling the debris and rubble to be drawn from the cutting tool have been referred to in the prior art mentioned above. The structure which is illustrated and described herein is a matter of choice for use with the hammer as described, although such structure is considered novel per se and hence is the subject matter of another patent application co-pending herewith entitled "Vacuum Coupling for Percussive Hammers," Ser. No. 667,805, filed Sept. 14, 1967 in the name of Thomas G. Bixby, one of the applicants herein and assigned to the assignee of this application.

The vacuum coupling is designated generally 302 and comprises a metal adapter member 304 having an insert of plastic or rubber-like material 305 to which the free end of the flexible pipe 300 is secured. This insert is tightly held against the chuck 202 over the bottom end of the transverse debris and ejection passageway 212 by means of a helical coiled spring 306 secured in a spring clip 308 that has a flap portion 312 covering the upper end of the passageway 212 as best shown in FIGS. 2 and 3. A finger loop 310 enables the entire clip to be pulled axially rearward of the chuck 202 to uncover the entrance to the passageway 212, preferably without disturbing the adapter and insert. In use, the arrangement is normally as shown in the illustrations. The chuck 202 is readily oscillated by the workman in operating the hammer 20 and the debris and rubble are drawn into the chuck 202, pass down the passageway 212 and into the vacuum system of the hammer 20 by way of the flexible pipe 300. The flexibility of this latter conduit length permits of such oscillation.

After the anchor 216 has been set and its end 214 broken off and is still in the socket 206, with the hammer 20 deenergized, the workman will pull the clip 308 rearward, that is to the left as seen in the views, until the upper entrance to the passageway 212 is uncovered. He then may insert the drift pin and force the broken end 214 out of its socket, so that the hammer is ready for another anchor to be inserted into the socket 206 for installation.

What it is desired to be secured by Letters Patent of the United States is:

1. In combination with a percussive hammer having a vertically oriented motor and motor housing, a horizontal barrel mounted at the top of the housing and having a reciprocating ram therein operatively coupled with the motor and means at the end of the barrel for mounting a drilling tool removably to the barrel, a handle connected to the housing, means for drawing debris from the drilling tool during use of the hammer and means for catching the same, comprising:
   (A) an impeller coupled to the motor and means forming an impeller chamber within the housing at the bottom thereof, the impeller rotating within the chamber to produce a low pressure condition at the entrance to the chamber,
   (B) a debris catcher removably secured to the motor housing and connected to the outlet of the impeller chamber to catch debris discharged from the chamber,
   (C) a passageway within the housing extending from the chamber entrance to an opening adjacent the barrel, and
   (D) a debris conduit connected with said opening at one end of said conduit and having a support connection with said barrel at the second end of said conduit, a bracket secured to and dependent from the end of said barrel and providing said support connection, said passageway opening being spaced below said barrel, said debris conduit comprising a flexible pipe arranged substantially parallel with the barrel and having at least the second end removable from said support connection to give access to the interior of said debris conduit, said second end of said conduit adapted to be coupled with the cutting tool to apply suction thereto during the use of the hammer.

2. The combination of claim 1 in which there is a flexible length of pipe connected to the second end of said conduit and providing at least a portion of said last-mentioned coupling.

3. The combination of claim 1 in which said debris conduit is extensile and has a normal length greater than the distance between said opening and said support connection so as to enable its frictional support therebetween by virtue of its tendency to extend, applying axial pressure outward of its ends.

4. The combination of claim 1 in which a flexible flapper valve is provided in said debris conduit to prevent reverse movement of debris out of said conduit.

5. The combination of claim 1 in which said debris coinduit includes a rubble separator portion secured to said second end, said rubble separator being provided on its interior with sieve means selectively to trap rubble of a predetermined size larger than the derbis permitted to pass into the impeller chamber, access to said rubble separator being had when said removable end is removed to enable emptying rubble accumulated in said separator.

6. The combination of claim 1 in which said debris catcher is a foraminous bag.

7. The combination of claim 6 in which said flexible bag has a mouth to permit emptying thereof, said mouth being formed of a pair of contiguous lips, and the handle having clamping means for pressing the lips together to keep the mouth closed, but the lips being removable from said clamping means.

8. The combination of claim 6 in which said flexible bag has an opening normally closed by a pair of contiguous lips, said handle has a slot arranged slidably to receive the lips in engaged condition during the use of the hammer, but permiting withdrawal of said lips to enable separation thereof to permit debris to be emptied from the bag through the opening.

9. The combination of claim 6 in which said foraminous bag has an interior woven member and an exterior protective cover member having a plurality of perforations, said cover member being provided at least on the bottom of said bag.

10. A combined percussive hammer and debris cleaning device for use in drilling a hole in concrete and the like which comprises:
 (A) a motor housing having an electric motor therein arranged to rotate on a generally vertically oriented axis,
 (B) a barrel mounted on the top of the housing and having an axis arranged generally normal to the motor axis, having a reciprocating ram therein and means at the forward end of the barrel for operatively and removably mounting a drilling tool therein in coupled relation to said ram,
 (C) means coupling the motor to the ram to drive the ram in reciprocating movement within the barrel,
 (D) an impeller coupled to the bottom of the motor,
 (E) means forming an impeller chamber at the bottom of the housing,
 (F) a debris catcher removably secured to the housing in communication with said chamber to receive debris discharge from the chamber during use of the hammer,
 (G) means in the housing forming a debris passageway opening in the front of the housing below the barrel and connected internally of the housing in communication with the impeller chamber,
 (H) a pipe support secured at the said forward end of the barrel and depending therefrom,
 (I) a first length of pipe connected from the debris passageway opening to said pipe support, said end which opens to said pipe support being removably secured therein to give access to the interior of the first length of pipe, and
 (J) a pipe socket in the support for extending a second length of pipe from the support to a drilling tool to draw debris which may be produced at said tool into said catcher during use of the hammer.

11. A structure as claimed in claim 10 in which said socket is formed of a synthetic resinous material and a second length of pipe is provided, also of synthetic resinous material and having its end ahered to said socket.

12. The structure as claimed in claim 10 in which said first length of pipe is at least partially flexible and is resiliently extensible normally to a length at least slightly greater than the distance between the debris passageway opening and the pipe support so as to press said one end axially against said pipe support but will permit manual contraction to enable removal from said pipe support and lateral flexing for access to the interior of said first length of pipe.

13. A structure as claimed in claim 12 in which said first pipe length has a rubble accumulating chamber formed therein capable of being emptied when said pipe length is laterally flexed from its connection with said pipe support.

References Cited

UNITED STATES PATENTS

| | | | |
|---|---|---|---|
| 1,334,430 | 3/1920 | Ayotte | 175—213 X |
| 1,821,824 | 9/1931 | Woodward | 55—382 |
| 2,182,165 | 12/1939 | Smith | 175—206 X |
| 2,375,689 | 5/1945 | Reeder | 173—75 X |
| 3,022,840 | 2/1962 | Hohos et al. | 175—213 X |
| 3,256,944 | 6/1966 | Holzapfel | 173—75 |

ERNEST R. PURSER, Primary Examiner

U.S. Cl. X.R.

173—13, 116; 74—44

UNITED STATES PATENT OFFICE

CERTIFICATE OF CORRECTION

Patent No. 3,511,322　　　　　　　　Dated　　May 12, 1970

Inventor(s) Thomas G. Bixby, Bruce L. Kaufman, Harrison R. Holman

It is certified that error appears in the above-identified patent and that said Letters Patent are hereby corrected as shown below:

```
Column 1, line 32 change "opening" to --opened--;
          line 39, change "alos" to --also--;
          line 66, change "is" to --in--;
Column 2, line 24, after "chuck" insert --has--;
          lines 27 to 29, delete "the trigger alongside of the
          handle. The bail is in his hammer by its handle in
          his right hand, his finger on" and substitute
          --hammer by its handle in his right hand, his finger
          on the trigger alongside of the handle. The bail is
          in his--;
Column 3, line 9, after "up" delete "to";
          line 55, change "gard" to --regard--;
Column 5, line 6, change "joint" to --joins--;
          line 6, before "the bottom" insert --to--;
          line 38, after "at" delete "the";
Column 6, line 6, change "aonther" to --another--;
          line 43, change "orizontal" to --horizontal--;
Column 8, line 3, change "position" to --portion--;
          line 69, change "seocnd" to --second--;
Column 10, line 17, change "cylinder" to --cylindrical--;
Column 11, line 9, change "ram 216" to --ram 126--;
           line 35, change "adapter" to --adapters--;
```

SIGNED AND
SEALED

SEP 29 1970

(SEAL)
Attest:

Edward M. Fletcher, Jr.
Attesting Officer

WILLIAM E. SCHUYLER, JR.
Commissioner of Patents